(12) United States Patent
Clayton et al.

(10) Patent No.: US 6,328,070 B2
(45) Date of Patent: *Dec. 11, 2001

(54) VALVE ARRANGEMENT FOR CONTROLLING HYDRAULIC FLUID FLOW TO A SUBSEA SYSTEM

(75) Inventors: Hugh R. Clayton; Grahame M. Williams, both of Houston, TX (US)

(73) Assignee: ABB Offshore Systems Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,223

(22) Filed: Mar. 1, 1999

(51) Int. Cl.⁷ ..................................................... F16K 11/10
(52) U.S. Cl. ........................................... 137/884; 137/271
(58) Field of Search ..................................... 137/271, 884

(56) References Cited

U.S. PATENT DOCUMENTS

| | | | |
|---|---|---|---|
| 3,513,876 | * 5/1970 | Tarbox | 137/884 |
| 3,806,088 | * 4/1974 | Stoneman et al. | 251/367 |
| 3,817,281 | 6/1974 | Lewis et al. | |
| 3,957,079 | 5/1976 | Whiteman | |
| 3,993,091 | * 11/1976 | Loveless | 137/269 |
| 4,078,574 | 3/1978 | Kosarzecki | |
| 4,328,826 | 5/1982 | Baugh | |
| 4,404,989 | 9/1983 | LeMoine | |
| 4,553,589 | 11/1985 | Jennings et al. | |
| 4,607,701 | 8/1986 | Gundersen | |
| 5,794,651 | * 8/1998 | Miller | 137/454.5 |

FOREIGN PATENT DOCUMENTS 0 767 330 A2   4/1997 (EP) .

\* cited by examiner

Primary Examiner—John Fox
(74) Attorney, Agent, or Firm—Bracewell & Patterson, L.L.P.

(57) ABSTRACT

A valve arrangement for controlling hydraulic fluid flow to a subsea system includes a plurality of docking modules each having a valve element for controlling the flow of a fluid and a docking module port for fluid flow between the valve element. The valve arrangement additionally includes a manifold having manifold ports of uniform cross section. The docking modules can be interchangeably mounted to the manifold ports as desired to tailor the valve arrangement for any selected valve operation. The valve arrangement also includes an adapter for alternately sealingly interconnecting a first docking module port which is different in shape or area than the cross section of the uniform size manifold port to any selected manifold port so as to permit sealed fluid flow between the first docking module port and the manifold port in one configuration of the valve arrangement and sealingly interconnecting a second docking module port of a different cross-sectional shape or area than the first docking module port to the same selected manifold port so as to permit sealed fluid flow between a second valve element and the first manifold port in another configuration of the valve arrangement.

14 Claims, 11 Drawing Sheets

VALVE ARRANGEMENT FOR CONTROLLING HYDRAULIC FLUID FLOW TO A SUBSEA SYSTEM

BACKGROUND OF THE INVENTION

The present invention relates to a valve arrangement and, more particularly, to a valve arrangement for a plurality of hydraulic control valves of the type commonly designated as sub-plate mounted (SPM) valves.

Hydraulic fluid supply systems supply hydraulic fluid to the hydraulic actuators of various mechanical devices for the actuation of the devices. Undersea wells are one source for the recovery of certain petroleum products such as oil and gas and the operation of such undersea wells presents considerable maintenance and installation challenges. In such subsea or underwater well environments, hydraulic fluid supply or control systems are commonly provided to control a blow out preventer. The blow out preventer typically includes a number of valves having specialized functions and these valves frequently are actuated by valve operators which are capable of being controlled from a remote location through energization by a controllable actuation system.

One type of controllable actuating system is comprised of hydraulic control valves arranged in a subsea structure which incorporates various hydraulic valves and regulators, hydraulic connector systems, solenoid operated pilot valves, and electronic packages. One type of hydraulic control valve which may be comprised in the hydraulic control arrangement for a subsea structure such as a blow out preventer is referred to as a sub-plate mounted (SPM) valve. This type of valve is typically a hydraulically piloted control valve which controls the flow of hydraulic fluid to and from a subsea operator such as, for example, blow-out preventer rams or choke and kill valves.

One conventional arrangement for accommodating a number of valves such as sub-plate mounted (SPM) valves comprises a relatively large valve block having valve pockets machined therein each for receiving a valve and drilled galleries for fluid communication with the valves. One drawback of this conventional arrangement is that the large valve block is typically customized for its particular installation and is thus configured to accommodate a selected group of valves which may be of differing sizes. Accordingly, should the fluid handling requirements change, modification or redesign of the valve block may be relatively complex or cost-prohibitive. If a single block of metal is machined or bored to create the valve pockets and galleries, another disadvantage arises in that the entire valve block may need to be discarded even if the damage is limited to only a portion of the block such as, for example, damage to the retaining threads of a valve pocket or the threads of a port.

SUMMARY OF THE INVENTION

It is one object of the present invention to provide a valve arrangement which facilitates its installation in its ultimate operational location and which facilitates the repair or replacement of key constituent elements thereof.

It is another object of the present invention to provide a valve arrangement which substantially promotes the installation and repair or replacement of constituent elements thereof in an operational location of the valve arrangement under adverse conditions such as might be found in surface or subsea hydraulic fluid control arrangements.

It is a further object of the present invention to provide a valve arrangement which offers a substantial range of flexibility in its configuration so that improvements, adaptations, and reconfiguration of the valve arrangement is facilitated.

According to one aspect of the present invention, a valve arrangement for controlling hydraulic fluid flow to a subsea system is provided. The valve arrangement includes a plurality of docking modules including a first docking module and a second docking module. The first docking module includes a first valve element for controlling the flow of a fluid and a first docking module port for fluid flow between the first valve element and an external source with the first docking module port having a cross section of a predetermined shape and area.

The second docking module includes a second valve element for controlling the flow of a fluid and a second docking module port for fluid flow between the second valve element and an external source with the second docking module port having a cross section which is different in at least one of shape and area than the cross section of the first docking module port. The valve arrangement additionally includes a manifold having a first manifold port and a second manifold port, the first and second manifold ports having generally the same cross-sectional shape and area which is different in at least one of shape and area than the cross section of the first docking module port.

The valve arrangement of the one aspect of the present invention also includes means for alternately sealingly interconnecting the first docking module port to the first manifold port so as to permit sealed fluid flow between the first valve element and the first manifold port in one configuration of the valve arrangement and sealingly interconnecting the second docking module port to the first manifold port so as to permit sealed fluid flow between the second valve element and the first manifold port in another configuration of the valve arrangement. Furthermore, the valve arrangement includes means for removably securing the first and second docking modules to the manifold for fluid flow between each docking module and the manifold.

In accordance with further details of the one aspect of the present invention, the means for alternately sealingly interconnecting includes an adapter means having a conduit of generally the same cross-sectional shape and area as the first module port and a seal interface surface. The adapter means may be a disposable element or, alternatively, an element which can be reused in successive securements of a docking module and the manifold. The adapter means is disposable relative to the manifold and the first docking module in a manner in which the seal interface surface of the adapter means is sealingly connected with the manifold and the first docking module and the conduit of the adapter means is aligned with the first docking module port and the first manifold port for fluid flow between the first docking module port and the first manifold port via the conduit of the adapter means.

According to another feature of the one aspect of the present invention, the valve arrangement further comprises a first mounting frame releasably securable with the first valve element to form the first docking module, means for releasably securing the first valve element to the first mounting frame, and the means for removably securing the first and second docking modules to the manifold includes means for detachably mounting the first mounting frame to the manifold. Preferably, the means for releasably securing the first valve element to the first mounting frame includes a frame mounted portion secured to the first valve element and a removable portion selectively movable between a retaining position in which it is secured to the frame mounted portion to thereby retain the first valve element and the first mounting frame in a secured together disposition and a non-retaining position in which the first valve element and the first mounting frame can be moved out of their secured together disposition with one another. Moreover, the frame mounted portion of the means for releasably securing the first valve element to the first mounting frame preferably includes a material having a hardness greater than the first mounting frame.

According to yet other details of the one aspect of the present invention, the first and second manifold ports have cylindrical cross sections of identical diameter and the first docking module port has a cylindrical cross section of smaller diameter than the individual diameter of one of the first and second manifold ports. Additionally, the second docking module port has a cylindrical cross of a diameter equal to the individual diameter of one of the first and second manifold ports.

Other optional features of the one aspect of the present invention include a common passageway formed in the manifold fluidly connected to the first and second manifold ports and a U-tube fluidly connected to the first manifold port.

According to another aspect of the present invention, a valve arrangement for controlling hydraulic fluid flow to a subsea system is provided and includes a first valve element for controlling the flow of a fluid and a second valve element for controlling the flow of a fluid. The valve arrangement of this another aspect of the present invention also includes a first docking module configured to interchangeably receive one of the first and second valve elements and having a first docking module port for fluid flow between the respective one of the first and second valve elements received by the first docking module and an external source, the first docking module port having a cross section of a predetermined shape and area.

Moreover, the valve arrangement includes a manifold having a first manifold port and a second manifold port, the first and second manifold ports having a substantially identical cross section which is different in at least one of shape and area than the cross section of the first docking module port.

In this another aspect of the present invention, the means for alternately sealingly interconnecting of the valve arrangement includes a conduit element having a conduit of generally the same cross-sectional shape and area as the first module port and having a connecting surface of generally the same cross-sectional shape and area as the substantially identical cross section of the first and second manifold ports. The conduit element is removably couplable with at least one of the first manifold port and the first docking module port in a manner in which the connecting surface is sealingly connected with the first manifold port and the conduit is aligned with the first docking module port for fluid flow between the first docking module port and the first manifold port via the conduit element. The valve arrangement also includes means for removably securing the first docking module to the manifold for fluid flow between the respective one of the first and second valve elements received in the first docking module and the manifold.

According to additional features of the another aspect of the present invention, the means for removably securing the first docking module to the manifold is operable to removably secure the first docking module in a selected predetermined relative orientation to the manifold and the first docking module includes means for alternately disposing the first valve element in a fluid flow disposition such that, upon securement of the first docking module in the one selected predetermined relative orientation to the manifold, the first valve element is sealingly communicated with the conduit the conduit element via the first docking module port in the one configuration of the valve arrangement. Also, the first and second manifold ports preferably have cylindrical cross sections of uniform diameter, the first docking module port has a cylindrical cross section, and the cylindrical cross section of the first docking module port is of smaller diameter than the uniform individual diameter of the first and second manifold ports, and the conduit of the conduit element has a cylindrical cross section of the same diameter as the first docking module port.

DETAILED DESCRIPTION OF THE PREFERRED EMBODIMENTS

As shown in FIGS. 1–4, one embodiment of a valve arrangement for a subsea drilling control unit is illustrated.

The valve arrangement, generally designated as 10, is designed to control selected functions associated with the exploration or drilling of subsea wells for the extraction of hydrocarbons such as, for example, oil or gas. As will be described in more detail, the valve arrangement 10 is particularly suitable for controlling the operation of a blow-out preventer (BOP) stack and the ancillary function provided by Lower Marine Riser Packages (LMRP).

Figure 2:
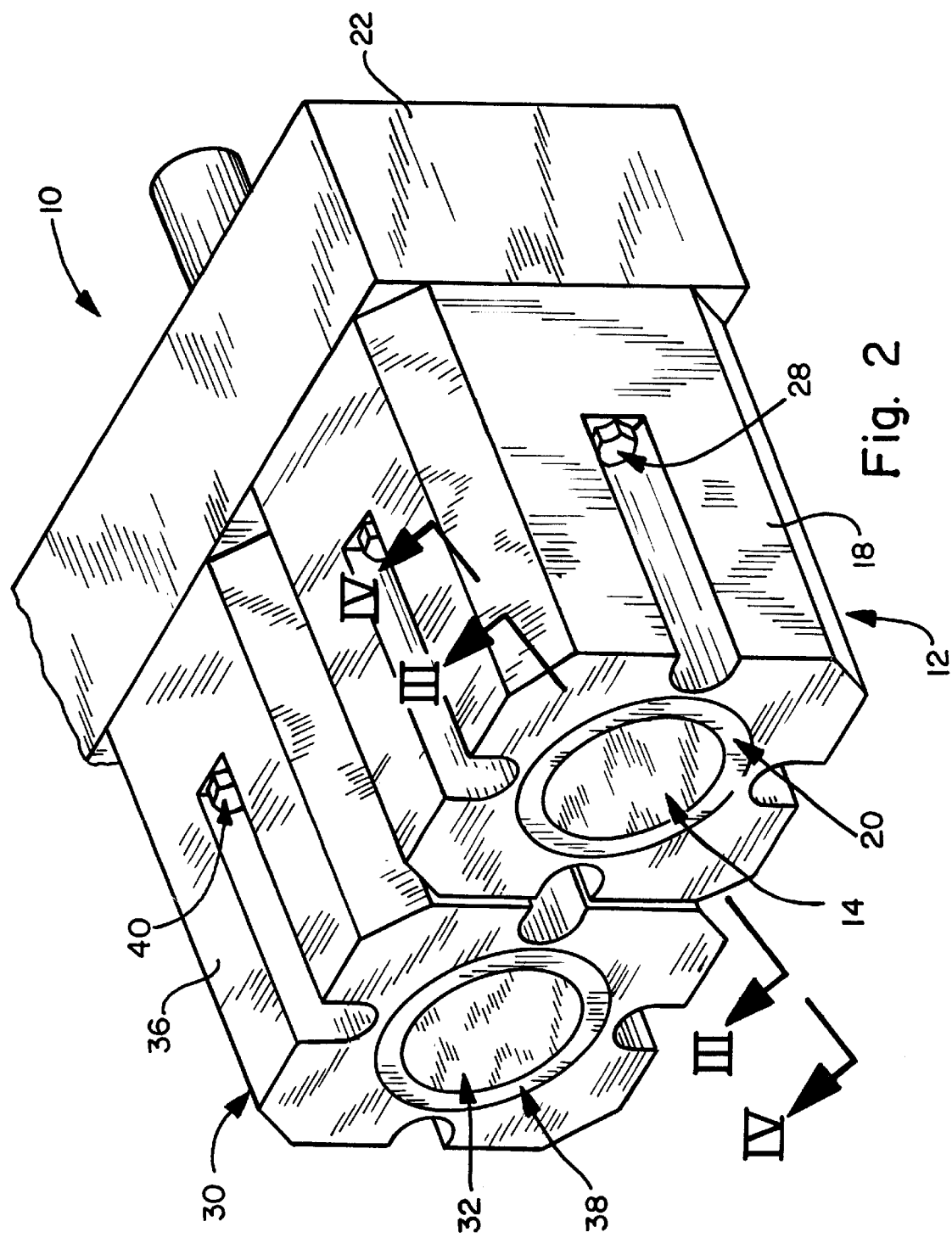
FIG. 2 is an enlarged exploded perspective view of a portion of the one embodiment of the valve arrangement shown in FIG. 1 and showing in greater detail the valve element and mounting frame of a docking module.

With particular reference now to FIG. 2, the valve arrangement 10 includes a first docking module 12 having a first valve element 14 for controlling the flow of a fluid, such as, for example, a hydraulic fluid, and a first series of docking module ports 16A, 16B, and 16C for communicating the first valve element 14 with a manifold, to be described in more hereafter, for fluid flow between the first valve element 14 and the manifold when the first docking module 12 is mounted to the manifold. The first docking module 12 also includes a first mounting frame 18 releasably secured with the first valve element 14 by a means 20 for releasably securing the first valve element 14 to the first mounting frame 18.

The valve arrangement 10 additionally includes a manifold to which the first docking module 12 is mountable. The manifold, generally designated as 22, has a first series of manifold ports 24A, 24B, and 24C, and a second series of manifold ports 26A, 26B, and 26C. The first docking module 12 is removably securable to the manifold 22 by a means for removably securing the first docking module 12 to the manifold 22 is provided preferably in the form of a first module—manifold securing assembly 28.

The valve arrangement 10 additionally includes a second docking module 30 having a second valve element 32 for controlling the flow of the fluid, a second series of docking module ports 34A, 34B, and 34C, each for fluidly communicating between the second valve element 32 and the manifold 22, and a second mounting frame 36. The second mounting frame 36 is releasably securable with the second valve element 32 by operation of a second means 38 for releasably securing the second valve element 32 to the second mounting frame. The second docking module 30 is removably securable to the manifold 22 by operation of a means for removably securing the second docking module 30 to the manifold 26 preferably in the form of a second module—manifold fastening assembly 40.

Figure 1:
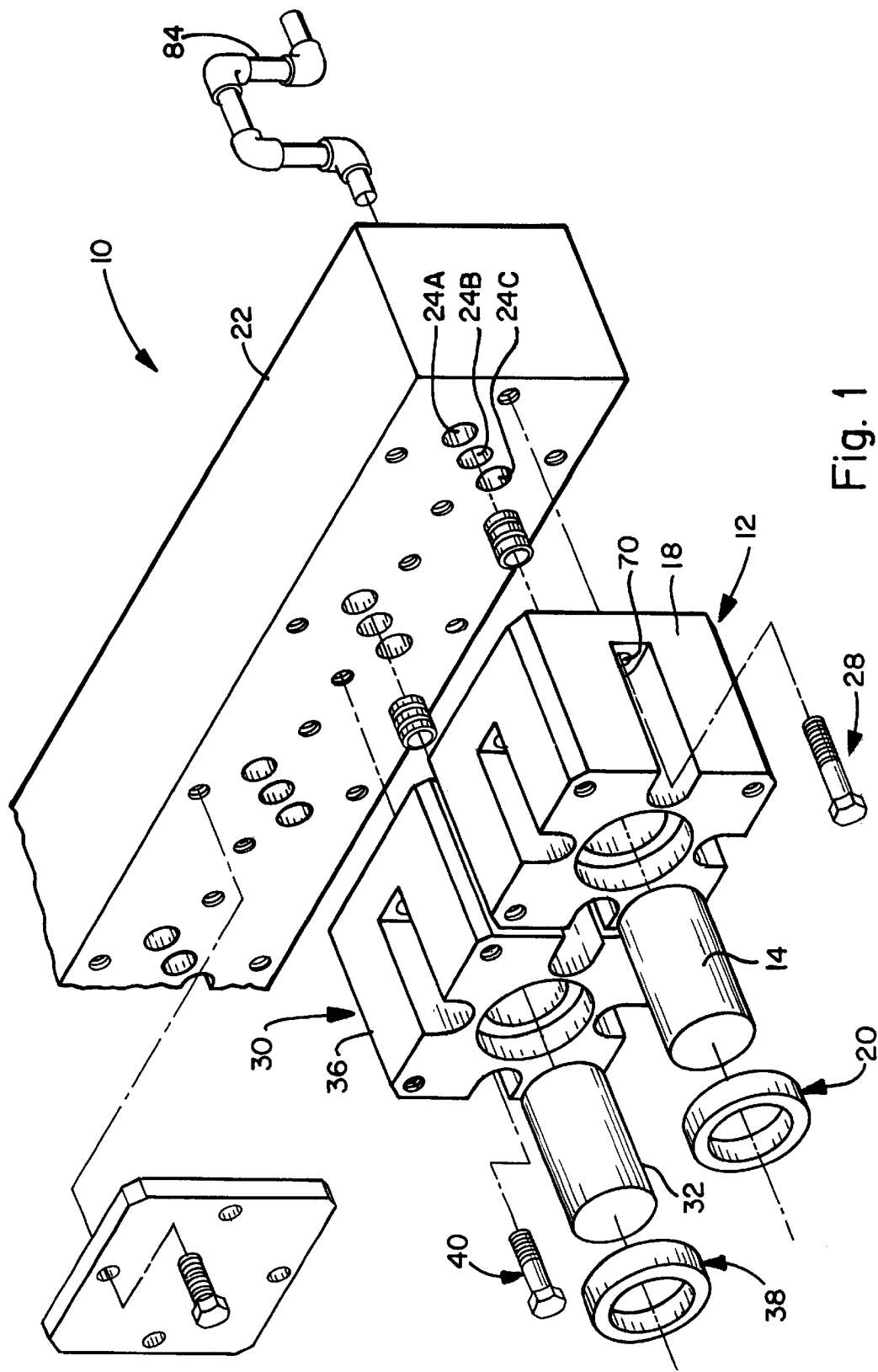
FIG. 1 is an exploded perspective view of one embodiment of the valve arrangement of the present invention.
Figure 3:
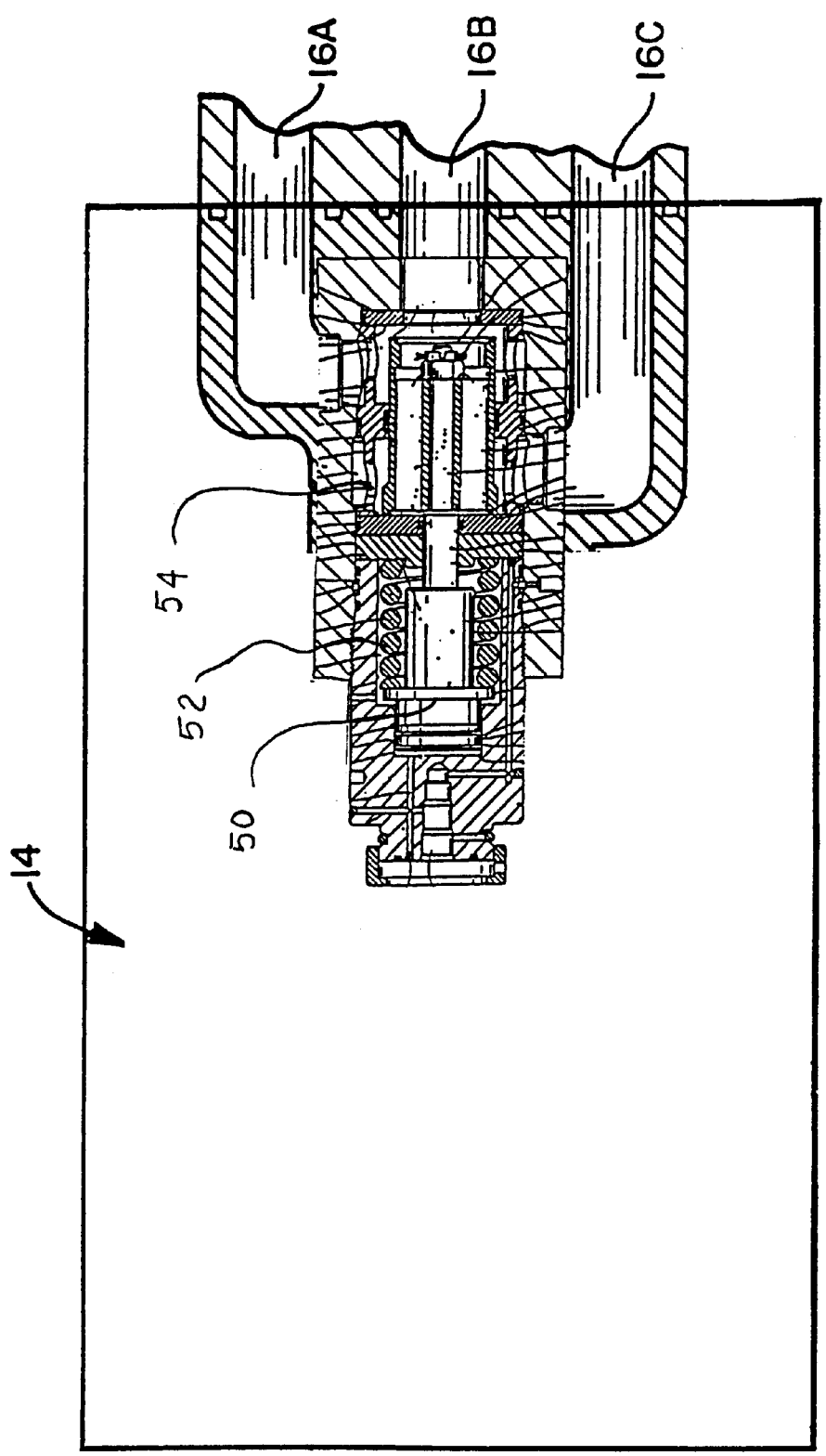
FIG. 3 is an enlarged perspective view in partial vertical section of the valve element of the docking module shown in FIG. 2, taken along lines III—III thereof.
Figure 4:
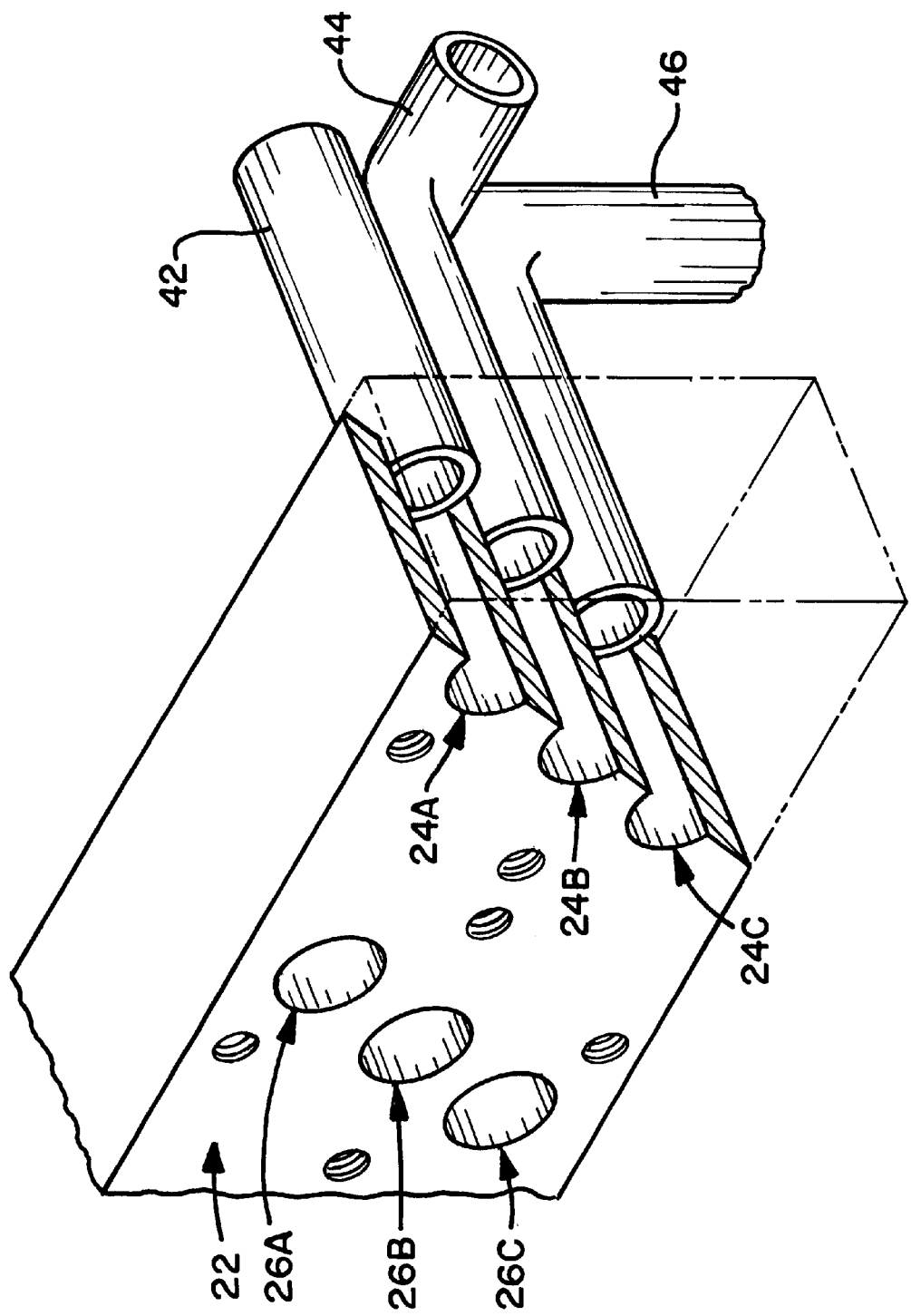
FIG. 4 is an enlarged perspective view, in partial vertical section, of the one variation of the manifold shown in the one embodiment of the valve arrangement shown in FIG. 1, taken along lines IV—IV thereof.

Reference is now made to FIG. 4, which is a partial vertical sectional view of the one variation of the manifold 22 of the one embodiment of the valve arrangement illustrated in FIGS. 1–3, for a discussion in greater detail of the structure and operation of the manifold. As seen in FIG. 4, in the one variation of the manifold 22, each of the first series of manifold ports 24A, 24B, and 24C is independently fluidly communicated with an external source via a conduit 42, 44, 46, respectively. Thus, none of the first series of manifold ports 24A, 24B, and 24C is commonly communicated with a counterpart manifold port in the second series of manifold ports 26A, 26B, and 26C. For example, the manifold port 24A of the first series of manifold ports, which may be, for example, a port for handling fluid vented via the first docking module port 16A, is not fluidly communicated with its counterpart manifold port 26A of the second series of manifold ports, which itself is fluidly communicated with the second docking module port 34A.

Instead the first manifold port 24A is independently communicated with the conduit 42 while the second manifold port 26A is independently communicated with an external source via another conduit (not shown). In this variation of the manifold 22, the manifold can be configured, for example, as a parallelepiped block of a homogenous material such as, for example, stainless steel and each of the first series of manifold ports 24A, 24B, and 24C and the second series of manifold ports 26A, 26B, and 26C is formed, for example, by machining or boring a cylindrical throughbore in the stainless steel block extending through the manifold 22 from one side thereof to an opposite side.

The manifold 22 can thus accommodate a plurality of docking modules, such as the first docking module 12 and the second docking module 30, for selectively routing the flow of fluids to and from the respective valve elements comprised within each docking module such as, for example, the first valve element 14 and the second valve element 32 comprised in the first docking module 12 and the second docking module 30, respectively. The valve elements of the docking modules may be selected to be identical—if, for example, the valve elements are SPM valves, then each valve element may be selected as a standard size SPM valve such as, for example, 0.75 inches, 1.0 inches, or 1.5 inches, it being understood that the standard size description is related to the valve's $C_v$, a standard measure of the volume of fluid that will pass through a valve at a given differential pressure. Alternately, the valve elements of the docking modules may be individually different from one another. For illustrative purposes in the following description, the first valve element 14 and the second valve element 32 are to be understood to be identical SPM valves, each having three ports—vent, inlet, and outlet ports—with the respective vent ports being designated with the "A" suffix (e.g., the ports 24A, 26A), the respective inlet ports being designated with the "B" suffix (e.g., the ports 24B, 26B), and the respective outlet ports being designated by the "C" suffix (e.g., the ports 24C, 26C). Moreover, the respective ports of the valve elements which perform the same vent, inlet, or outlet function will be referred to as counterpart ports.

With further reference now to the structure and operation of each of the valve elements of the first docking module 12 and the second docking module 30, attention is drawn to FIG. 3, which is an enlarged perspective view, in longitudinal cross section of a portion of the first valve element 14, it being understood that the second valve element 32 can, as desired, be identically configured as the first valve element 14 or may be comprised of a valve structured for a different type of valve operation. The first valve element 14 is representatively shown as a type of hydraulic control valve commonly referred to as a sub-plate mounted (SPM) valve which is configured to control the flow of hydraulic fluid to and from a subsea operator. Blow-out preventer (BOP) rams and choke and kill valves are two examples of the type of subsea operators to which the first valve element 14 may be operatively connected for controlling the flow of hydraulic fluid thereto. One exemplary configuration of a sub-plate mounted (SPM) valve which the first valve element 14 may comprise includes, as shown in FIG. 3, a valve configuration in which the first docking module port 16A is a vent port, the first docking module port 16B is an outlet or function port, and the first docking module port 16C is an inlet or supply port. The first valve element 14 is operably controllable between a first flow disposition in which the first docking module port 16B, in its function as an outlet port, is fluidly communicated with the first docking module port 16C, in its function as an inlet port, and a second disposition in which the first docking module port 16B, in its function as an outlet port, is fluidly communicated with the first docking module port 16A, in its function as a vent port, while the first docking module port 16C, in its function as an inlet port, is blocked. An SPM control valve having this configuration and controllable in this manner is disclosed in U.S. Pat. No. 5,771,931, which is herein incorporated by reference.

The first valve element 14 further includes a pilot pressure circuit passage 48 connectable to an external fluid source (not shown) for selectively introducing fluid into a piston chamber to thereby effect movement of a piston member 50. The piston member 50 is moveable against the bias of a return spring 52 to dispose a flow passage 54 in a position for fluidly communicating the first docking module port 16A [the inlet or supply port] and the first docking module 16B [the outlet or function port] in the second disposition of the first valve element 14 while a seal sleeve isolates the first docking module 16c [the vent port] from the supplied fluid. The return spring 52 otherwise urges the piston member 50 to dispose the flow passage 54 in a position for fluidly communicating the first docking module port 16B [the outlet or function port] and the first docking module 16C [the vent port] in the first disposition of the first valve element 14.

Figure 5:
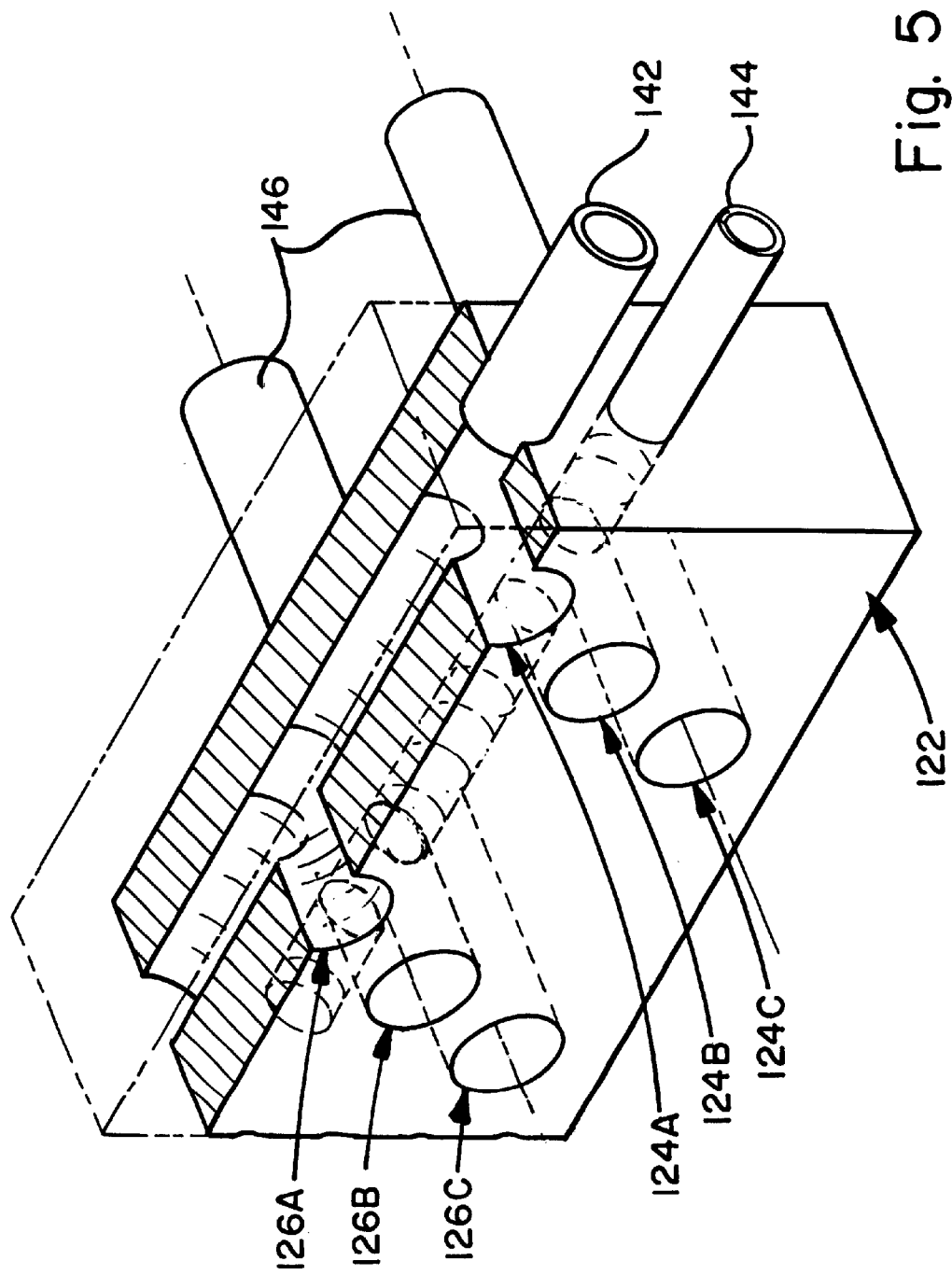
FIG. 5 is an enlarged perspective view, in partial horizontal section, of another variation of the manifold of the one embodiment of the valve arrangement and taken along lines V—V of FIG. 6.
Figure 6:
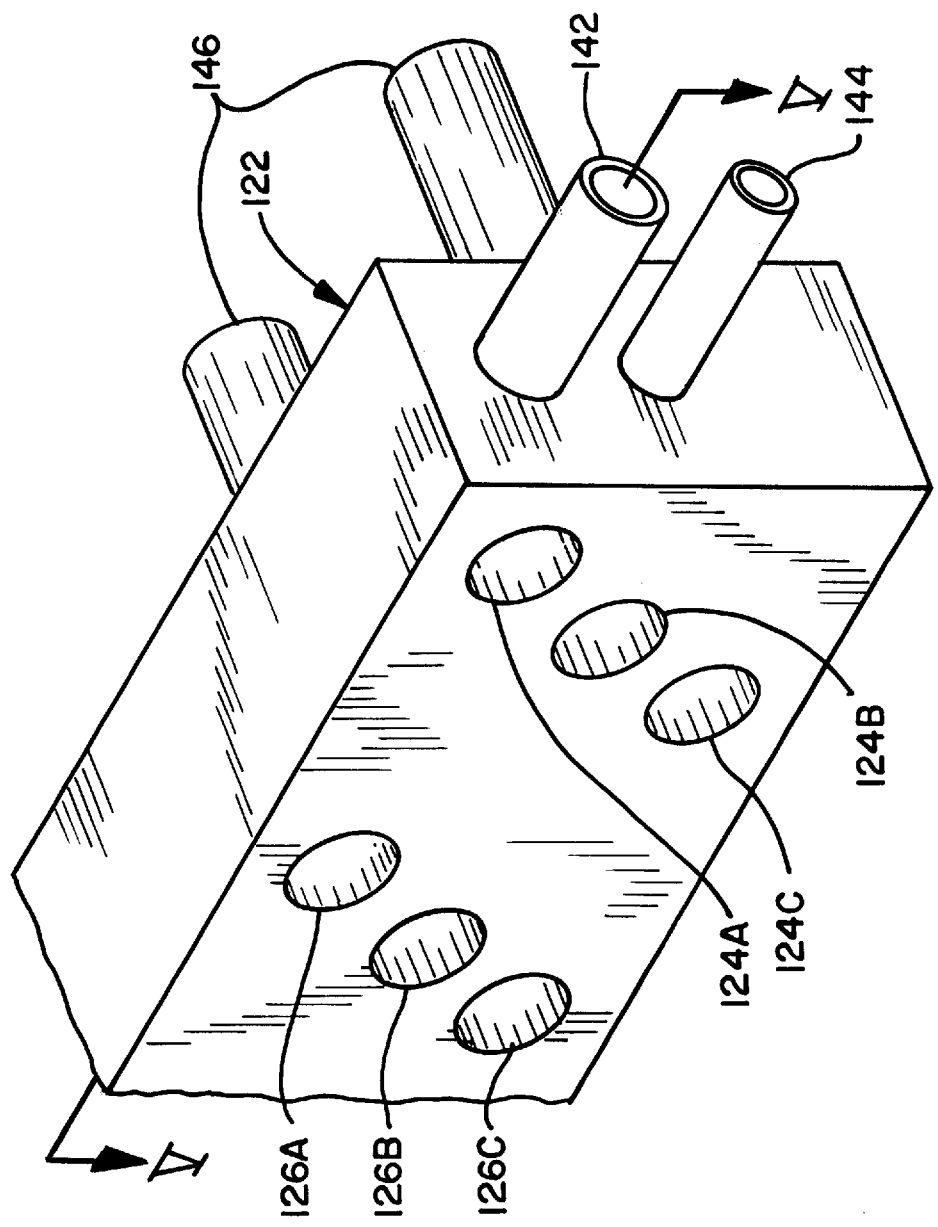
FIG. 6 is an enlarged perspective view of the another variation of the manifold of the one embodiment of the valve arrangement shown in FIG. 5.

In FIGS. 5 and 6, another variation of the manifold of the valve arrangement of the present invention is illustrated. In this variation, the manifold, generally designated as 122, includes a first series of manifold ports 124A, 124B, and 124C for fluidly communicating the first docking module 12 with the manifold and a second series of ports 126A, 126B, and 126C for fluidly communicating the manifold with the second docking module 30. The counterpart manifold ports 124A, 126A, as well as other counterpart manifold ports (not shown), are commonly fluidly communicated with one another by a first common passageway 142 extending generally transverse to each of these respective counterpart manifold ports along the longitudinal extent of the manifold 122 and communicated at one axial end thereof with an external source (not shown). If, for example, each of the counterpart manifold ports 124A, 126A, are vent ports fluidly communicated with the respective vent ports of the first valve element 14 and the second valve element 32, respectively, these manifold ports are operable to vent fluid to the common passageway 142 for flow of the vented fluid to the external source with which the common passageway 142 is communicated.

The manifold 122 further includes a second common passageway 144 fluidly communicating another plurality of counterpart manifold ports—namely, the counterpart manifold ports 124B, 126B, and other counterpart manifold ports (not shown). The second common passageway 144 is fluidly communicated with an external source for selective flow of fluid from the external source to the commonly communicated plurality of counterpart manifold ports or, alternatively, for fluid flow from the plurality of counterpart manifold ports to the external source. For example, the second common passageway 144 may be fluidly communicated with a hydraulic fluid supply source (HF) for common supply of hydraulic fluid to the first valve element 14, the second valve element 32, and any other valve elements secured to the manifold 122 and having a counterpart manifold port communicated with the second common passageway 144. In the variation of the manifold 122 shown in FIGS. 5 and 6, the manifold port 124C and the manifold port 126C are each separately communicated with an external source (not shown) via a respective separate conduit 146 sealingly secured to the manifold 122.

Figure 7:
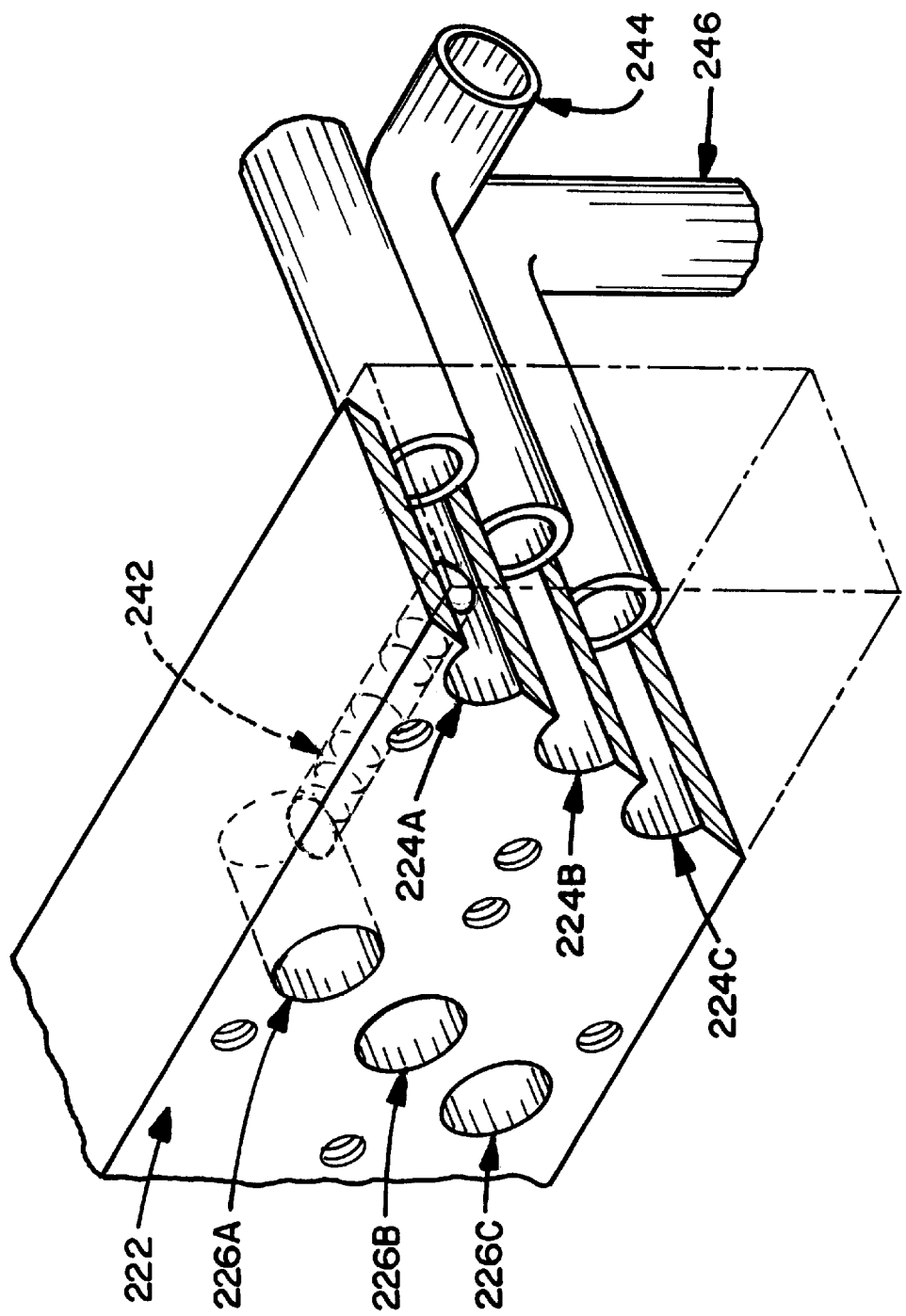
FIG. 7 is an enlarged perspective view, in partial vertical section, of a further variation of the manifold of the one embodiment of the valve arrangement and taken along lines VII—VII of FIG. 8.
Figure 8:
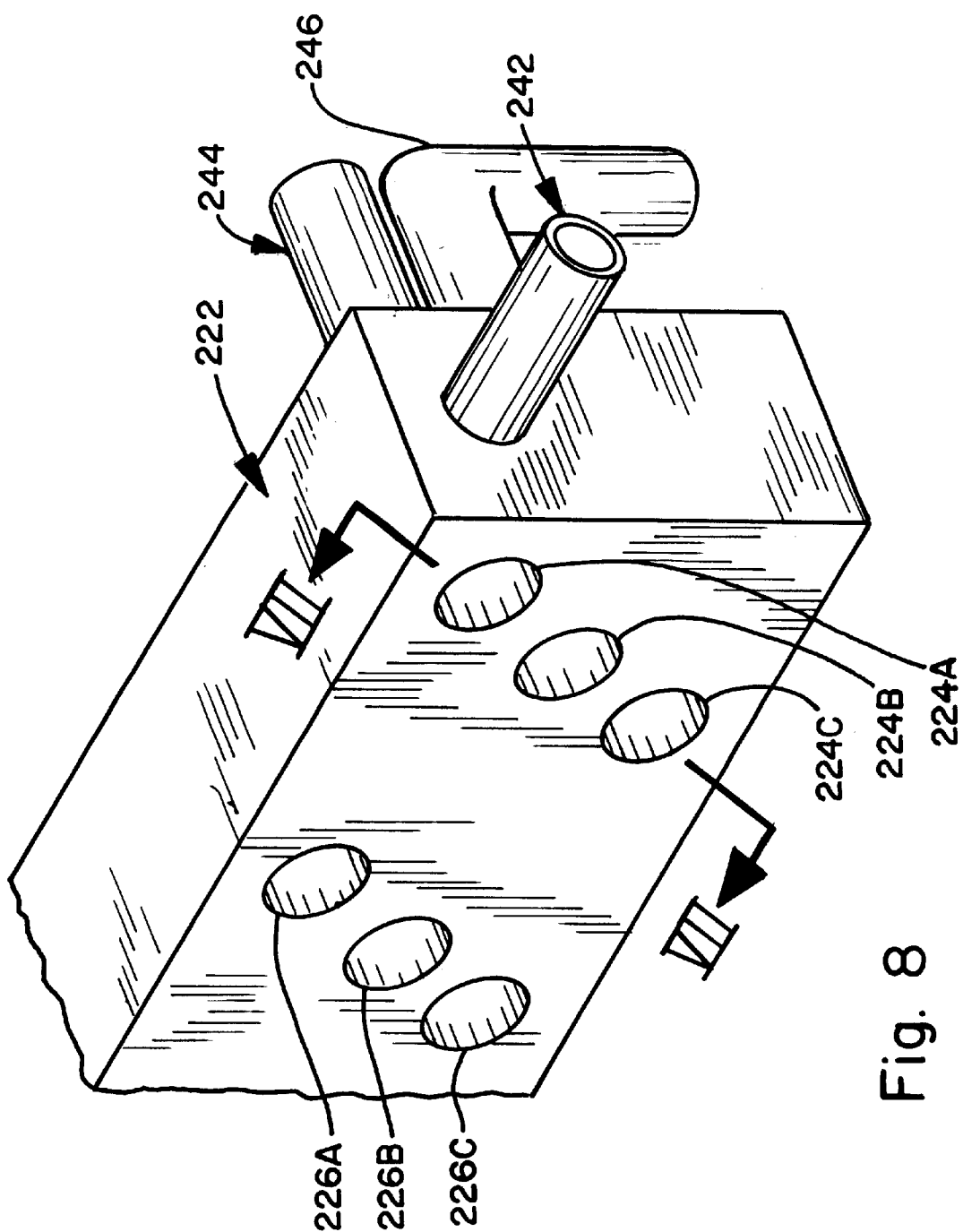
FIG. 8 is an enlarged perspective view of the further variation of the manifold of the one embodiment of the valve arrangement shown in FIG. 7.

A further variation of the manifold of the valve arrangement of the present invention is illustrated in FIGS. 7 and 8 and it can be seen that the manifold, which is generally designed as 222, includes a first series of manifold ports 224A, 224B, and 224C and a second series of manifold ports 226A, 226B, and 226C. As seen in FIG. 7, which is a perspective view of the manifold 222 in partial section through the first series of manifold ports 224A, 224B, and 224C, the counterpart manifold ports 224A, 226A are commonly fluidly communicated with a common passageway 242 for common fluid flow to or from an external source (not shown). The external source may be, for example, a hydraulic fluid collection location for collecting hydraulic fluid vented through the manifold ports 224A, 226A, or, alternatively, a hydraulic fluid supply source for supplying hydraulic fluid through these manifold ports.

The manifold ports 224B, 226B, which are counterpart manifold ports, are each separately communicated via a separate respective conduit 244 to an external source or sources (not shown). Likewise, the counterpart manifold ports 224C, 226C are each separately communicated with an external source or sources (not shown) via a separate respective conduit 246. It can thus be appreciated that the manifold 222 is operable to selectively communicate two of the valve element fluid flow operations such as, for example, the vent and outlet operations, in an independent manner for each respective docking module mounted to the manifold while conducting fluid from the third valve element operation, such as, for example, the inlet operation, in a common or shared flow manner from a single external source (e.g., a hydraulic fluid supply source) along the common passageway 242 to the plurality of docking modules mounted to the manifold.

Figure 9:
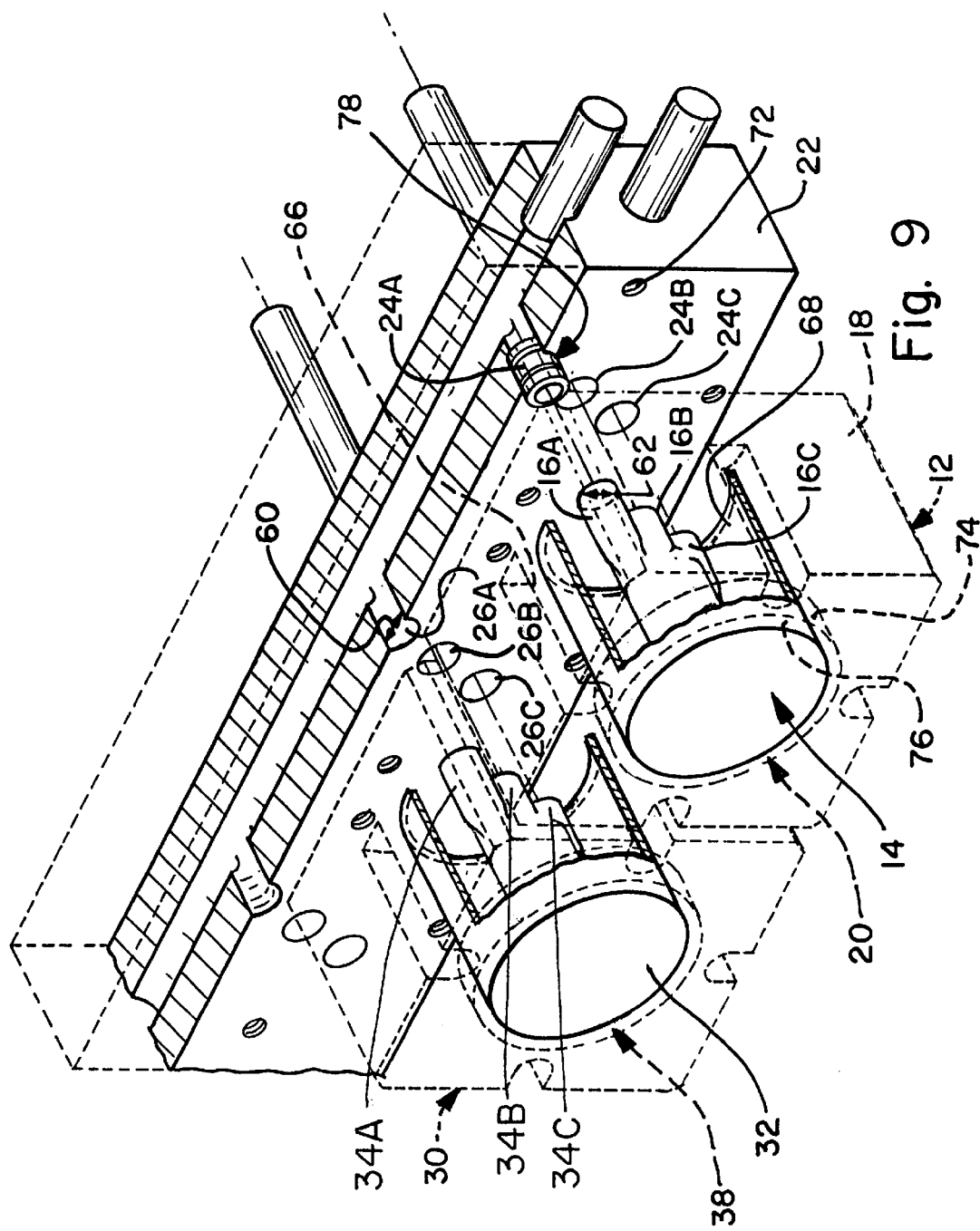
FIG. 9 is an enlarged perspective view, in partial horizontal section, of the another variation of the manifold shown in FIGS. 5 and 6, and showing, in exploded view, the first and second docking modules, in partial vertical section, mounted to the manifold via the adapter means in one configuration of the valve arrangement of the present invention.
Figure 10:
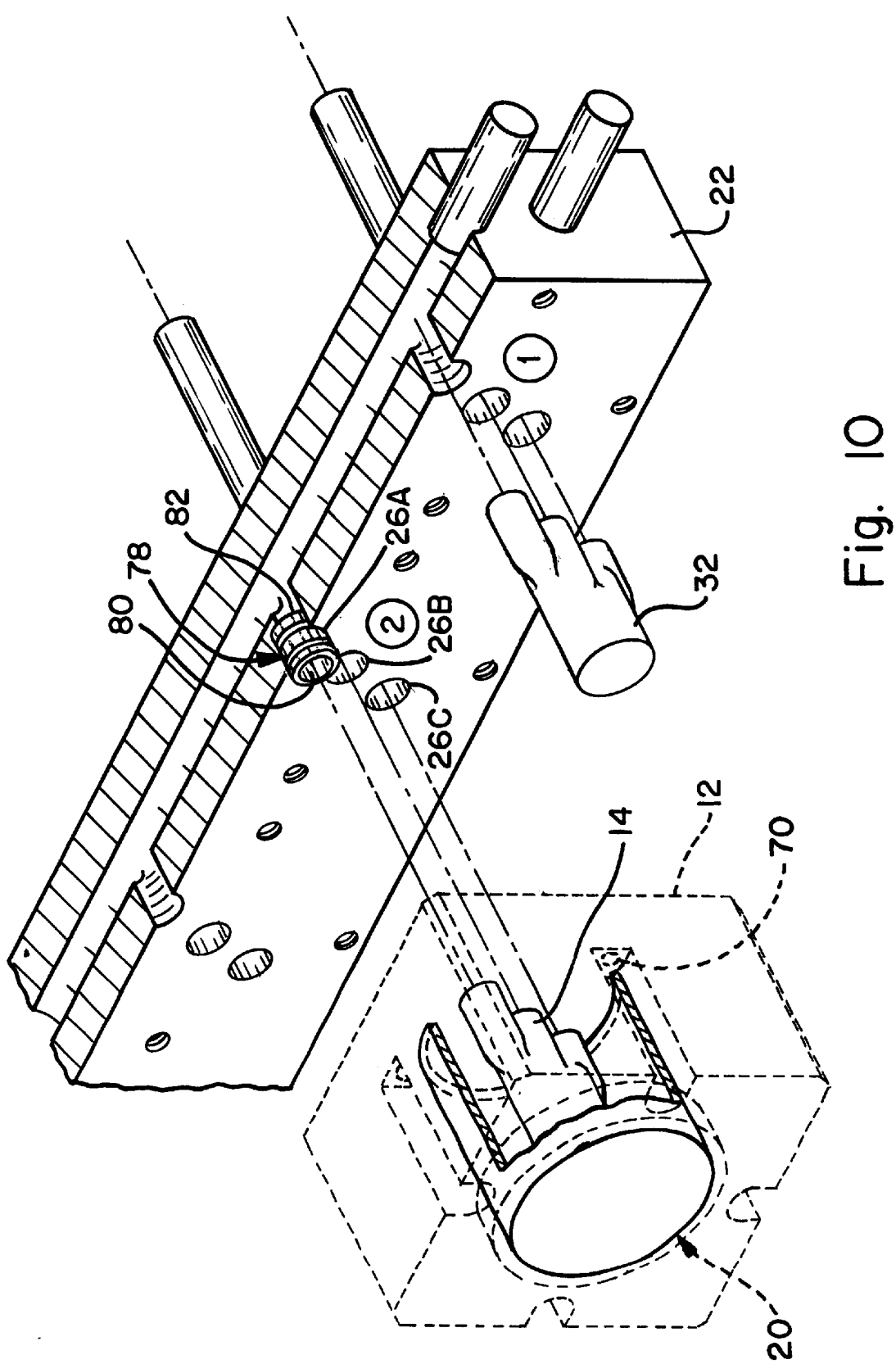
FIG. 10 is an enlarged perspective view of the another variation of the manifold shown in FIGS. 5 and 6, and showing, in exploded view, the first and second docking modules, in partial vertical section, mounted to the manifold via the adapter means in another configuration of the valve arrangement of the present invention.

Reference is now had to FIGS. 9 and 10 to illustrate the flexibility and ease of installation offered by the valve arrangement 10. In the illustrative configuration of the valve arrangement 10 shown in FIGS. 9 and 10, all of the manifold ports of the manifold 22 are of circular cross section and, further, all of the manifold ports have a circular cross section of the same diameter, generally designated as the diameter 60. Additionally, each of the docking module ports 34A, 34B, and 34C of the second docking module 30 has a circular cross section with a diameter equal to the diameter 60 of the manifold ports of the manifold 22 and, further, the circular cross sections of these docking module ports is identical. The docking module ports 16A, 16B, and 16C of the first docking module 12 have identical circular cross sections of a diameter 62 less than the diameter 60.

The first mounting frame 18 of the first docking module 12 is configured to interchangeably receive either the first valve element 14 or the second valve element 32—specifically, the first docking module 12. In the illustrative configuration shown in FIG. 9, for example, the respective received valve element received by the first docking module 12 is the first valve element 14 whereas, in the alternate configuration shown in FIG. 10, the respective received valve element received by the first docking module 12 is the second valve element 32. In the configuration shown in FIG. 9, the first valve element 14 is adapted to be mounted to the manifold 22 such that each of the first docking module ports 16A, 16B, and 16C is respectively linearly aligned with an associated one of the first manifold ports 24A, 24B, and 24C when the first docking module 12 is mounted to the manifold 22. The second docking module 30, which includes the second valve element 32, is configured in the illustrative configuration shown in FIG. 9 such that each of the second docking module ports 34A, 34B, and 34C is respectively linearly aligned with an associated one of the second manifold ports 26A, 26B, and 26C, when the second docking module 30 is secured to the manifold 22.

The first mounting frame 18 is specifically configured to interchangeably receive both the first valve element 14 and the second valve element 32 and includes a chamber 66, preferably cylindrical, which is adapted to receive the complementary cylindrically shaped housing 68 of the respective first valve element 14 or second valve element 32. The first mounting frame 18 also includes a plurality of throughbores 70, each for supporting one of a plurality of securement bolts of the first module manifold securing assembly 28. The securement bolts are adapted to be threadingly secured in a respective threaded securement bore 72 formed in the manifold 22 to thereby secure the first docking module 12 to the manifold 22 in an orientation to be described in more detail hereafter.

The means 20 for releasably securing the respective received valve element (e.g., the first valve element 14) to the first mounting frame 18 is preferably in the form of a threaded locking assembly having a frame mounted portion 74 secured to the first valve element 14 and a removable portion 76. The frame mounted portion 74 includes threads formed in the first mounting frame 18 and the removable portion 76 is a cylindrical cap having external threads on its outer circumference adapted to be threadingly received in the threads of the frame mounted portion 74. The cylindrical cap is selectively movable between a retaining position in which it is secured to the frame mounted portion 74 to thereby retain the first valve element 14 and the first mounting frame 18 in a secured together disposition and a non-retaining position in which the first valve element 14 and the first mounting frame 18 can be moved out of their secured together disposition with one another. The second means for releasably securing the second valve element 32 to the second mounting frame 36 is also preferably configured as a threaded locking assembly operable similarly to the threaded locking assembly of the means 20 for releasably securing the first valve element 14 to the first mounting frame 18.

The removable portion 76 is preferably comprised of a material having a hardness greater than the first mounting frame 18. For example, if the first mounting frame 18 is formed of a stainless steel such as, for example, 316 stainless steel, then the removable portion 76 may be formed of a material such as a steel sold under the designation "Monel" which has a hardness greater than that of 316 stainless steel.

It can be seen in the illustrative configuration of the valve arrangement 10 shown in FIGS. 9 and 10 that the docking modules can accommodate docking module ports of varying geometries and dimensions. For example, the second valve element 32 has docking module ports at least one of which has a cross section different in at least its shape or its area than the respective docking module port of the first valve element 14. Thus, the valve arrangement 10 of the present invention can accommodate the two different docking module port geometries and dimensions irrespective of which one of the particular docking modules—in this example, the first docking module 12 or the second docking module 30—is mounted at the selected location on the manifold 22 for communication of its respective docking module ports with the associated manifold ports at the selected manifold location. To further illustrate this operational flexibility, reference is made to FIG. 9, in which it can be seen that, in the one configuration of the valve arrangement 10 shown in FIG. 9, the first and second series of manifold ports 24A, 24B, and 24C and 26A, 26B, and 26C have, as noted, cylindrical cross sections of uniform diameter 60, the first series of docking module ports 16A, 16B, and 16C have identical cylindrical cross sections of diameter 62, and the cylindrical cross section of the first docking module ports is of smaller diameter than the uniform individual diameter of the first and second manifold ports 24A, 24B, and 24C and 26A, 26B, and 26C. Accordingly, the first docking module ports 16A, 16B, and 16C of the first docking module 12 must be sealingly interconnectable with the manifold ports of the manifold 22 in a manner which accommodates the cross sections of these docking module ports, on the one hand, and the different cross sections of the manifold ports, on the other hand, while still accommodating the second docking module ports 34A, 34B, and 34C in the event that the respective received valve element received by the first docking module 12 is the second valve element 32. The docking module ports 34A, 34B, and 34C of the second docking module 30, being of the identical cross-sectional size (circular) and area as any given series of manifold ports such as, for example, the series of manifold ports 26A, 26B, and 26C, can be readily sealingly interconnected to the manifold ports via a conventional seal or gasket arrangement customarily employed in sealingly interconnecting two conduit ends having identical cross-sectional sizes and areas. On the other hand, to effectuate the sealed fluid communication of the first docking module ports 16A, 16B, and 16C with their respective associated manifold ports, the valve arrangement includes means for alternately sealingly interconnecting the first valve element 14 to one of the first series of manifold ports such as, for example, the first manifold port 24A, via a first docking module port (i.e., the first docking module port 16A) so as to permit sealed fluid flow between the first valve element 14 and the first manifold port 24A in one configuration of the valve arrangement and, as seen in FIG. 10, sealingly interconnecting the second valve element 32 to the first manifold port 24A via the same docking module port (in this example, the first docking module port 16A) so as to permit sealed fluid flow between the second valve element 32 and the first manifold port 24A in another configuration of the valve arrangement.

As seen in FIG. 10, the means for alternately sealingly interconnecting includes a conduit element 78 having a conduit 80 of generally the same cross-sectional shape and area as the first docking module port 16A and having a connecting surface 82 of generally the same cross-sectional shape and area as the substantially identical cross section of the first and second manifold ports 24A, 26A. The conduit element 78 is removably couplable with at least one of the first manifold port 24A and the first docking module port 16A in a manner in which the connecting surface 82 is sealingly connected with the first manifold port 24A and the conduit 80 is aligned with the first docking module port 16A for fluid flow between the first docking module port 16A and the first manifold port 24A via the conduit element 78. Also, the conduit 80 of the conduit element 78 has a cylindrical cross section of the same diameter as the diameter 62 of the first docking module port 16A. If desired, appropriate countersunk bores can be provided in connection with each manifold port on the manifold 22 and each docking module port of the docking modules to accommodate therein the conduit elements 78, which can include appropriate O-rings or other sealing elements to be sealingly accommodated within the countersunk bores.

Figure 11:
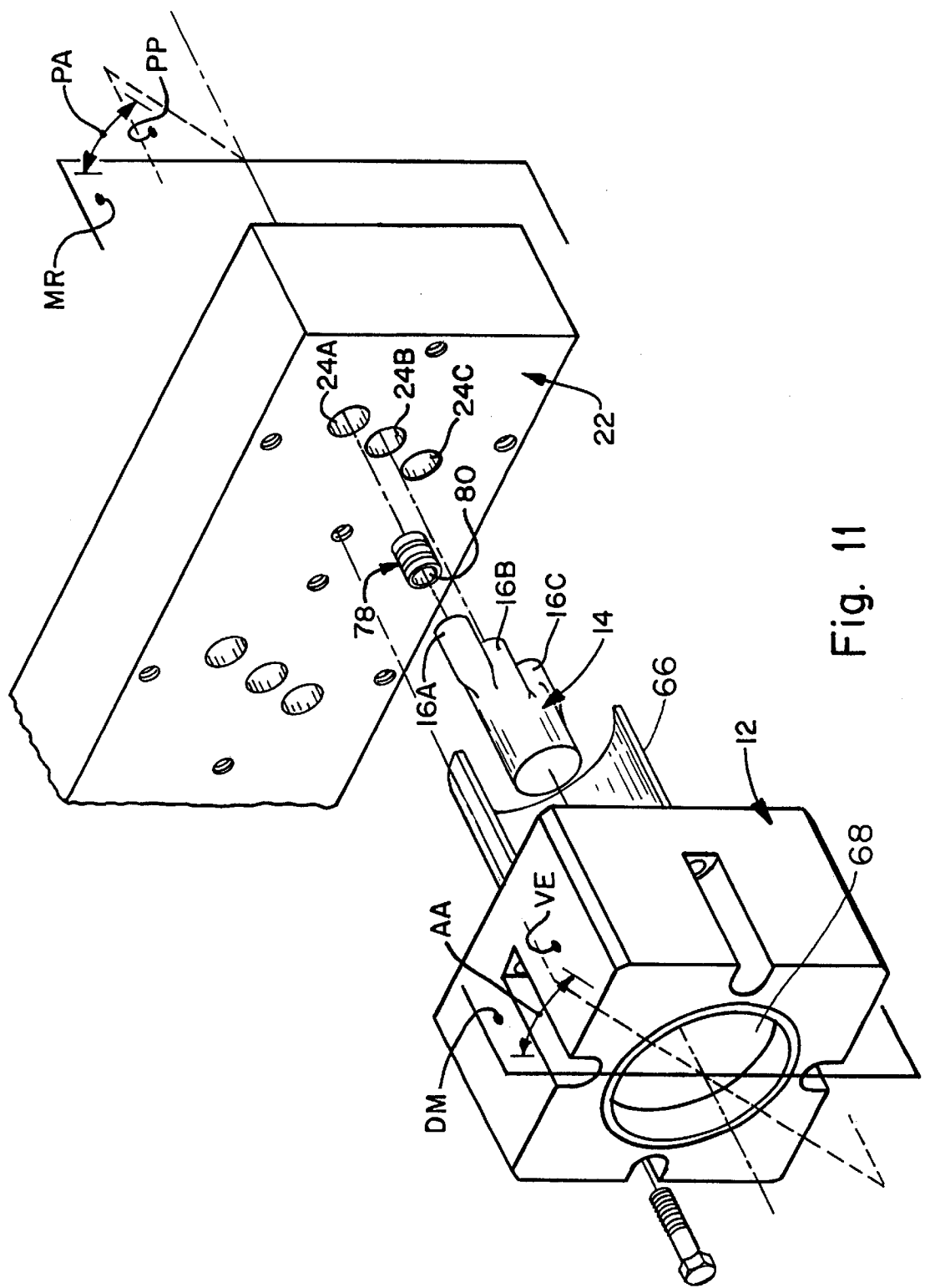
FIG. 11 is an enlarged perspective exploded view of a portion of the valve arrangement shown in FIG. 9 having the another variation of the manifold.

Further in configuring the valve arrangement 10 to optimize its arrangement flexibility and ease of installation and repair, the means for removably securing the first docking module 12 to the manifold 22 is operable to removably secure the first docking module 12 in a selected predetermined relative orientation to the manifold 22. As seen in FIG. 11, the cylindrical housing 68 of the first valve element 14 is secured within the corresponding cylindrical chamber 66 of the first mounting frame 18 at a predetermined relative orientation thereto such that the first docking module ports 16A, 16B, and 16C are sealingly communicated with, and co-axial with, the respective conduit 80 of the conduit elements 78 which communicate the first docking module ports with their respective associated first manifold ports 24A, 24B, and 24C upon mounting of the first docking module 12 to the manifold 22 in the one selected predetermined relative orientation of the first docking module 12 to the manifold 22. Specifically, the cylindrical housing 66 of the first valve element 14, as measured relative to a plane VE extending through the axial centerlines of the first docking module ports 16A, 16B, and 16C, is disposed at an acute angle AA relative to an alignment plane DM of the first docking module 12. The alignment plane DM of the first docking module 12 is an arbitrary reference plane which will be co-extensive with a manifold reference plane MR upon mounting of the first docking module 12 to the manifold 22, thereby characterizing the one selected predetermined relative orientation between the first docking module 12 and the manifold 22. The axial centerlines of the first manifold ports 24A, 24B, and 24C are disposed on a manifold port plane PP which forms an angle PA with the manifold reference plane MR.

Thus, as a result of the predetermined angular orientation of the cylindrical housing 68 of the first valve element 14 relative to the corresponding cylindrical chamber 66 of the first mounting frame 18 in which it is received, the first docking module ports 16A, 16B, and 16C are sealingly communicated with, and co-axial with, the respective conduit 80 of the conduit elements 78 which communicate the first docking module ports with their respective associated first manifold ports 24A, 24B, and 24C upon mounting of the first docking module 12 to the manifold 22 in the one selected predetermined relative orientation. Since the second valve element 32 is also housed in a housing identical to the cylindrical housing 68 of the first valve element 14, the second valve element 32 can be interchangeably received in the chamber 66 of the first mounting frame 18 at a predetermined relative angular orientation thereto such that the second docking module ports 34A, 34B, and 34C are sealingly communicated with, and co-axial with, their respective associated first manifold ports 24A, 24B, and 24C upon mounting of the first docking module 12 to the manifold 22 in the one selected predetermined relative orientation. Thus, it can be seen that the first docking module 12 includes means for alternately disposing the first valve element 14 in a fluid flow disposition such that, upon securement of the first docking module in the one selected predetermined relative orientation to the manifold, the first valve element 14 is sealingly communicated with the conduit 80 of the conduit element 78 via the first docking module port 16A in the one configuration of the valve arrangement and the second valve element 32 in a fluid flow disposition such that, upon securement of the first docking module 12 in the one selected predetermined relative orientation to the manifold 22, the second valve element 32 is sealingly communicated with the first manifold port 24A via the first docking module port 16A in the other configuration of the valve arrangement.

In some circumstances, the ease of interchangeably mounting the docking modules to the manifold 22 can be best optimized by configuring the docking module ports of each docking module such that each respective docking module port is linearly aligned—i.e., co-axial—with the respective associated manifold port on the manifold 22. In other circumstances, however, it may be more preferred that the docking module ports of a docking module are not linearly aligned—i.e., not coaxial—with their respective associated manifold ports on the manifold 22.

With reference again to FIG. 1, in the event that the valve arrangement 10 includes separate conduits for the entirety of the manifold ports or separate conduits for a sub-set of manifold ports such as, for example, all of the manifold ports associated with the vent ports of the valve elements secured to the manifold, it is preferred that the valve arrangement include a U-shaped conduit tube 84 fluidly connected to each such manifold port. This arrangement permits ease of fault finding—i.e., leakage in any individual fluid passage can be readily ascertained.

While an embodiment and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

We claim:

1. A hydraulic fluid manifold assembly, comprising:

a manifold block having a docking module side, a plurality of first manifold ports that lead to the docking module side in a selected first array, a plurality of second manifold ports that lead to the docking module side in a second array that is the same as the first array, the first and second manifold ports adapted to be connected to a fluid supply source and to equipment that is controlled by the manifold assembly;

first and second docking modules, each of the docking modules having an abutting side that abuts the docking module side of the manifold block, each of the docking modules having a cavity formed therein and a plurality of docking module ports that lead from the cavity to the abutting side, the docking module ports of the first docking module registering selectively with both the first array and the second array of manifold ports, the docking module ports of the second docking module registering selectively with both the first array and the second array of manifold ports, the cavity of the first docking module being of a larger diameter than the cavity of the second docking module;

first and second valve elements that are releasably received within the cavities of the first and second docking modules, respectively, the first valve element having a larger diameter than the second valve element; and fasteners extending through the docking modules into the manifold block for securing the docking modules to the manifold block.

2. The manifold assembly according to claim 1, wherein the cavity of each of the docking modules has an entrance on a forward side of each of the docking modules for reception of one of the valve elements, the forward side being opposite the abutting side.

3. The manifold assembly according to claim 1, wherein each array of the first and the second manifold ports includes a fluid inlet port, a fluid outlet port, and a vent port.

4. The manifold assembly according to claim 1, wherein the manifold block has a rearward side opposite the docking module side, and at least some of the manifold ports extend straight through the manifold block from the docking module side to the rearward side.

5. The manifold assembly according to claim 1, wherein:
the manifold block has a rearward side opposite the docking module side and a lateral side that is in a plane perpendicular to the docking module side and the rearward side;

at least some of the manifold ports extend straight through the manifold block from the docking module side to the rearward side; and wherein the manifold assembly further comprises:

at least one communicating passage in the manifold block extending in a straight line from one of the second manifold ports to one of the first manifold ports and to the lateral side.

6. The manifold assembly according to claim 1, further comprising:

a threaded retainer for each of the docking modules, each of the retainers being secured to one of the cavities for retaining one of the valve elements.

7. A hydraulic fluid manifold assembly for subsea drilling equipment:

a subsea manifold block with a first set of manifold ports having accesses arranged on a docking module side of the manifold block in a selected first array, a second set of manifold ports with accesses arranged on the docking module side of the manifold in a second array that has the same configuration as the first array, the first and second manifold ports adapted to be connected to a fluid supply source and to drilling equipment that is controlled by the manifold assembly;

a fluid communicating passage in the manifold block that interconnects at least one of the first manifold ports with at least one of the second manifold ports;

first and second docking modules, each of the docking modules having an abutting side that abuts the docking module side of the manifold block, each of the docking modules having a cylindrical cavity formed therein and a plurality of docking module ports that lead from the cavity and have accesses on the abutting side, the cavity of the first docking module having a different diameter than the cavity to the second docking module, the accesses of the docking module ports of the first docking module registering interchangeably with both the first array and the second array of manifold ports, the docking module ports of the second docking module registering interchangeably with both the first array and the second array of manifold ports;

first and second valve elements that are releasably received within the cavities of the first and second docking modules, respectively, the first and second valve elements having different diameters; and fasteners extending through the docking modules into the manifold block for securing the docking modules to the manifold block.

8. The manifold assembly according to claim 7, wherein the cavity of each of the docking modules has an entrance on a side of each of the docking modules opposite the abutting side for reception of one of the valve elements.

9. The manifold assembly according to claim 7, wherein each array of the first and the second manifold ports includes a fluid inlet port, a fluid outlet port, and a vent port, and wherein the fluid inlet port of the first manifold ports is connected to the fluid inlet port of the second manifold ports by the communicating passage.

10. The manifold assembly according to claim 7, wherein the manifold block has upper and lower ends and a lateral side that is perpendicular the upper and lower ends and the docking module side; and wherein:

the communicating passage in the manifold block extends from the lateral side in a straight line to one of the second manifold ports to one of the first manifold ports.

11. The manifold assembly according to claim 7, further comprising:

a threaded retainer for each of the docking modules, each of the retainers being secured to one of the cavities for retaining one of the valve elements.

12. A hydraulic fluid manifold assembly, comprising:

a manifold block having a forward side, a rearward side and a lateral side, a first set of manifold ports arranged in a selected pattern on the forward side, and a second set of manifold ports arranged in a pattern on the forward side that has the same dimensions and orientations as the first set, at least some of the manifold ports extending to the rearward side, each of the sets of manifold ports including a fluid supply port;

at least one communicating passage in the manifold block extending from the fluid supply port of the second manifold ports to the fluid supply port of the first manifold ports;

a plurality of conduits connected to the manifold ports on the rearward side for connecting the manifold assembly to a hydraulic fluid supply source and to equipment that is controlled by the manifold assembly;

first and second docking modules, each of the docking modules having a rearward side that abuts the forward side of the manifold block, each of the docking modules having a cylindrical cavity formed therein with an entrance on the forward side of the docking module, the cavity of the first docking module being of a larger diameter than the cavity of the second docking module, a plurality of docking module ports within each of the docking modules that lead from one of the cavities to the rearward side, the docking module ports of the first docking module registering interchangeably with both the first and the second manifold ports, the docking module ports of the second docking module registering interchangeably with both the first and the second manifold ports;

first and second valve elements that are received within the first and second docking modules, respectively, for controlling fluid flow through the docking module ports;

a threaded retainer for each of the docking modules that engages one of the cavities for releasably securing one of the valve elements in one of the cavities; and fasteners extending through the docking modules into the manifold block for securing the docking modules separately to the manifold block.

13. The manifold assembly according to claim 12, wherein each pattern of the first and the second manifold ports includes a fluid outlet port and a vent port.

14. The manifold assembly according to claim 12, wherein the communicating passage in the manifold block extends in a straight line between the fluid supply ports and to the lateral side for connection to a supply of fluid.

* * * * *